US008155022B1

(12) United States Patent
Ainsworth

(10) Patent No.: US 8,155,022 B1
(45) Date of Patent: Apr. 10, 2012

(54) METHOD AND SYSTEM FOR CONTROLLING POWER CONSUMPTION IN NETWORK NODES

(75) Inventor: Stephen Ainsworth, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 276 days.

(21) Appl. No.: 12/552,222

(22) Filed: Sep. 1, 2009

Related U.S. Application Data

(60) Provisional application No. 61/162,967, filed on Mar. 24, 2009.

(51) Int. Cl.
*H04L 1/00* (2006.01)
*H04L 12/56* (2006.01)

(52) U.S. Cl. .......... 370/252; 370/235; 370/395.21; 370/465; 455/522; 710/58

(58) Field of Classification Search .......... 370/252, 370/235, 395.21, 465; 455/522; 710/58
See application file for complete search history.

(56) References Cited

U.S. PATENT DOCUMENTS

2006/0239271 A1* 10/2006 Khasnabish et al. ...... 370/395.21
2008/0002585 A1* 1/2008 Safranek et al. ............. 370/235

* cited by examiner

*Primary Examiner* — Kwang B Yao
*Assistant Examiner* — Jamal Javaid
(74) *Attorney, Agent, or Firm* — Klein, O'Neill & Singh, LLP

(57) ABSTRACT

Method and system a first network node communicating with a second network node using a plurality of network links grouped as a trunk is provided. The method includes determining a peak data transfer rate for the trunk during a monitoring duration; comparing the peak data transfer rate to a threshold data transfer rate for the trunk; determining if one or more of the plurality of network links can be deactivated or activated; and based on the determination, activating or deactivating one or more of the plurality of network links.

16 Claims, 6 Drawing Sheets

METHOD AND SYSTEM FOR CONTROLLING POWER CONSUMPTION IN NETWORK NODES

CROSS REFERENCE TO RELATED APPLICATION

This application is related to U.S. provisional Application, Ser. No. 61/162,967, entitled Method and System for Optimizing Network Links, filed on Mar. 24, 2009, the disclosure of which is incorporated herein by reference in its entirety.

BACKGROUND

The present disclosure relates to networks and network links.

RELATED ART

Network systems are commonly used to move network information (may also be referred to interchangeably, as frames, packets or commands) between computing systems (for example, servers) or between computing systems and network devices (for example, storage systems). Various hardware and software components are used to implement network communication, jointly referred to as a network node. The term network node as referred to herein includes a network switch element, an adapter having a port supporting network communication and others.

Typically, for network communication, a plurality of network nodes are operationally coupled to each other using physical links. A plurality of physical links may be grouped together to provide a logical network link or data pipe, referred to herein as a transmission trunk. A transmission trunk may be used in network communication for redundancy and load balancing.

Transmission trunks experience a wide variety of usage. For example, during data backups the trunk is used at maximum capacity i.e., all physical links may operate at a high data rate. Similarly, during non-peak hours most of the links are unused or operate at a low data rate. Undersubscribed or under used network links consume power and also generate heat which requires additional cooling. Continuous efforts are being made to reduce and optimize power consumption in network nodes.

SUMMARY

In one embodiment, a machine implemented method for a network system having at least a first network node communicating with a second network node using a plurality of network links, the plurality of network links being grouped as a trunk is provided. The method includes: (a) monitoring a data transfer rate for the trunk for a duration; (b) determining a peak data transfer rate for the trunk during the monitoring duration; and (c) comparing the peak data transfer rate to a threshold data transfer rate for the trunk. The threshold data transfer rate establishes a minimum number of network links needed for communication between the first network node and the second network node.

The method further includes: (d) determining if one or more of the plurality of network links can be deactivated, based on the comparison in step (c); (e) the one or more of the plurality of network links can be de-activated, then automatically de-activating one or more of the plurality of network links; and (f) establishing a first new threshold data transfer rate based on the deactivated network links in step (e).

The method also includes determining if one or more of the plurality of network links can be activated if the peak data transfer rate is equal to or greater than the threshold data transfer rate. This step includes comparing a hypothetical threshold value which is based on a greater number of links than the number of links used for determining the peak transfer rate and then comparing the hypothetical threshold value to the peak data transfer rate.

In another embodiment, a network system is provided. The network system includes a first network node operationally coupled to a second network node using a plurality of links, the plurality of links being grouped into a trunk; and a computing system having a processor for setting a monitoring duration for monitoring a data transfer rate for the trunk and a peak data transfer rate for the trunk.

The first network node (i) monitors the data transfer rate and determines the peak data transfer rate for the trunk during the monitoring duration; (ii) compares the peak data transfer rate to a threshold data transfer rate for the trunk; and (iii) determines if one or more of the plurality of links can be deactivated or activated. If one or more links can be activated or deactivated, then the network node deactivates or activates one or more of the plurality of links.

One or more of the network links are de-activated if the peak data transfer rate is less than a first hypothetical threshold data transfer rate based on a fewer number of network links than a number of links used when the peak data transfer rate is determined. One or more of the network links are activated if the peak data transfer rate is equal to or greater than a second hypothetical threshold data transfer rate based on a greater number of network links than a number of links used when the peak data transfer rate is determined.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of a preferred embodiment. In the drawings, the same components have the same reference numerals. The illustrated embodiment is intended to illustrate, but not to limit the disclosure. The drawings include the following Figures.

DETAILED DESCRIPTION

Figure 1A:
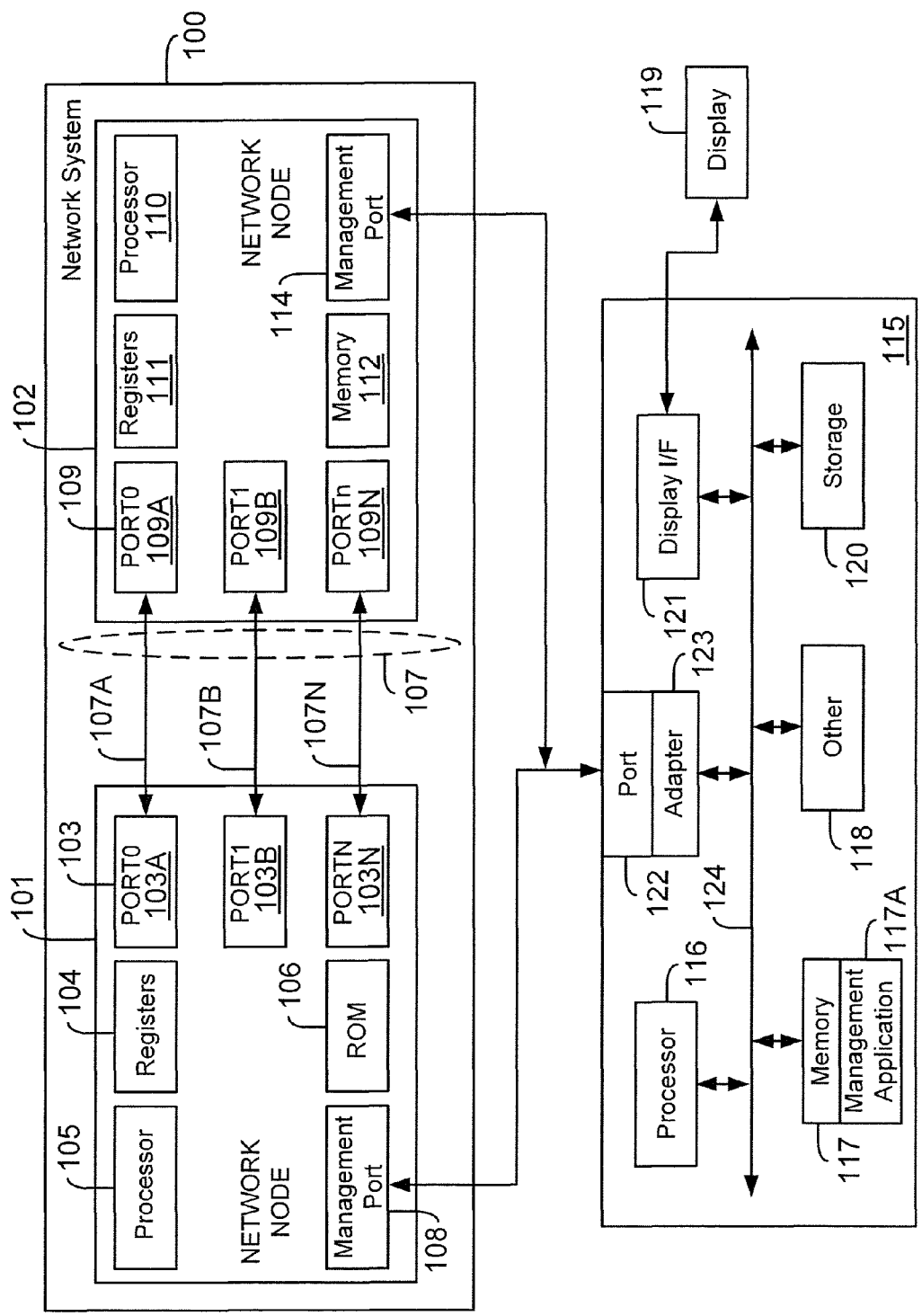
FIG. 1A shows a network system according to one embodiment.

Definitions:

The following definitions are provided as they are typically (but not exclusively) used in a networking environment, implementing the various adaptive aspects of the present disclosure.

"Data rate" means an amount of data received by a network link or transmitted by a network link within a duration (for example, per second).

"Dpeak" means a peak data rate detected during a monitoring period that may be referred to as Tmon.

"Dthresh" means a threshold value for trunk capacity used for determining trunk reduction or expansion. The threshold value may be calculated and is designed such the trunk is able to support a current data rate for network nodes communicating with each. The threshold value ensures that communication is not disrupted after link reduction or expansion. The threshold value establishes a minimum number of links needed for communication between network nodes.

"Latency" means a delay between received and transmitted data.

"Lactive" means a current number of active network links in a trunk at any give time.

"Lmax" means a maximum number of physical network links connected between nodes that are grouped together in a trunk.

"Ln" means a specific physical link number n a trunk.

"Network Node" means a physical component, a logical component, or a combination thereof that can support communication with another device or system. A network node may be a switch element with a plurality of ports, an adapter with at least one port and other similar devices that can facilitate network communication.

"Port" means a general reference to receive and transmit segments in a network node. A port includes physical and logical elements to receive and transmit network information, for example, packets and frames. The structure of a port depends on a protocol standard which the network node is configured to operate in. Examples of some commonly used standards are, Fibre Channel (FC), Ethernet, Fibre Channel over Ethernet (FCo), Infiniband (IB) and others.

"Trunk" (or transmission trunk) means a grouping of physical network links to provide a logical network link or data pipe.

"Tmon" means a time period for data rate monitoring and a trunk optimization cycle.

As used in this disclosure, the terms "component" "module", "system," and the like are intended to refer to a computer-related entity, either software-executing general purpose processor, hardware, firmware or a combination thereof. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Network System:

FIG. 1A is a block diagram of a network system 100 implementing the methods and systems in accordance with the adaptive embodiments of the present disclosure. Network system 100 may be based on Fibre Channel, Ethernet, FCoE, Infiniband, a combination thereof, or any other protocol.

System 100 includes a plurality of network nodes, for example, 101 and 102 that communicate with each other and other nodes. The network nodes 101 and 102 may be configured by using a computing system 115.

Network node 101 may include one or more ports 103A-103N, registers 104, a processor 105, memory 106 and a management port 108. Processor 105 executes firmware instructions out of memory 106 to control the overall node 101 operations. Processor 105 may be general purpose embedded microprocessor. In one embodiment, processor 105 performs instructions out of memory (for example "ROM") 106 to activate or deactivate links automatically, according to one embodiment of the present disclosure.

Network node 102 may also include plurality of ports 109A-109N (similar to ports 103A-103N), processor 110 (similar to 105), registers 111 (similar to 104), memory 112 (similar to 106) and a management port 114 (similar to 108).

Ports 103A-103N in network node 101 are operationally coupled via "links" or "paths" to ports 109A-109N of network node 102. For example, link 107A may be used to establish communication between port 103A and port 109A. Similarly, links 107B, 107N may be used between ports 103B and 109B, and 103N and 109N, respectively. The links 107A-107N may be optical, copper or any other type.

Physical links 107A-107N may be grouped as a trunk 107. Data is received and transmitted between the networking node 101 and the network node 102 via transmission trunk 107.

Network node 101 and 102 may be configured by a user using a computing system (also referred to as host system) 115. Computing system 115 is able to communicate with nodes 101 and 103 via a port 122 that is a part of an adapter 123. Port 122 communicates with management ports 108 and 114, respectively.

Host system 115 may also include a processor 116 that executes instructions out of memory 117 for performing certain operations, for example, reading/writing data to storage devices (not shown) and sending commands and data to network devices as well as executing a management application 117A for configuring the network nodes 101 and 102. Processor 116 interfaces with memory 117 via bus 124.

Computing system 115 may have access to storage device 120 that may be used to store programmable instructions which are executed by processor 116 out of memory 117. Storage device 120 may be a CD-ROM, non-volatile memory device, a hard disk or any other storage media that can store information.

Adapter 123 may be a converged network adapter (CNA) 123. CNA adapter 123 is configured to handle both network and storage traffic using a converged network and storage protocol, for example, FCoE. As an example, QLogic Corporation provides a CNA that may be used in system 100.

Computing system 115 is coupled to a display device 119 that displays a user interface to configure nodes 101 and 102. The user interface may be provided by management application 117A. The display device 119 may be a monitor, a television, a portable device, a cell phone or any other device that can display the user interface. The user interface may be a graphical user interface ("GUI") or a command line interface.

A user using management application 117A may program registers 104/111 through industry standard interface for example, I2C (not shown) to customize network system 100. For example, a user might activate or power down a link by programming a register in registers 104 and/or 111.

System 100 may use various network, storage or converged network/storage protocols for communication. The following is provided a brief introduction to some of the commonly used protocols and standards.

One common network protocol used for network communication is Ethernet. Ethernet is a family of frame-based computer networking technologies for local area networks (LANs). The Ethernet protocol defines a number of wiring and signaling standards for the Physical Layer of the OSI networking model, through means of network access at the Media Access Control (MAC)/Data Link layer, and a common addressing format.

The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gb (gigabit). The description of the various embodiments described herein are based on using Ethernet (which includes 100 Base-T and/or Gigabit Ethernet) as the network protocol, however, the adaptive embodiments disclosed herein are not limited to any particular protocol, as long as the functional goals are met by an existing or a new network protocol.

Converged Network and Storage Protocols are being developed to handle both network and storage traffic. One such developing standard is the FCoE standard. The FCoE standard is being developed so that network adapters and network switches are able handle both network and storage traffic using network and storage protocols.

One common storage protocol used in storage area networks is Fibre Channel (also referred to as "FC"). Fibre Channel supports three different topologies, point-to-point, arbitrated loop and Fabric. The point-to-point topology attaches two devices directly. The arbitrated loop topology attaches devices in a loop.

The Fibre Channel Fabric topology attaches host systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port.

Fibre Channel switches use memory buffers hold frames received and sent across a network. Associated with these buffers are credits, which are the number of frames that a buffer can hold per Fabric port.

Figure 1B:
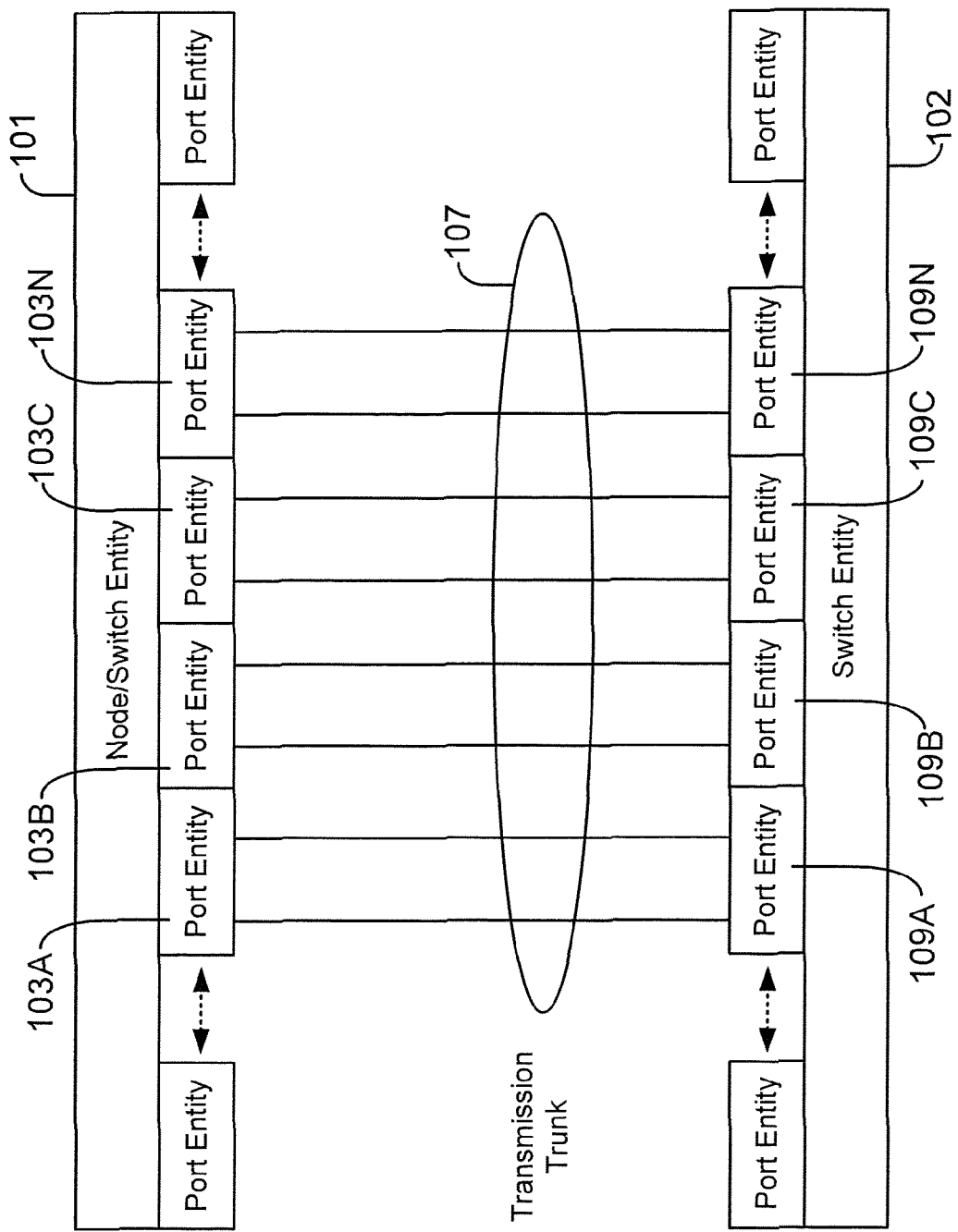
FIG. 1B shows an example of "trunking" between multiple ports of two network nodes, used according to one embodiment of the present disclosure.

Trunking:

FIG. 1B shows an example of trunking between multiple ports of nodes 101 and 102, according to one embodiment of the present disclosure. In this example, links between ports 103A-103N and 109A-109N are grouped as trunk 107 (also shown in FIG. 1A).

In this example, data traffic between the network node 101 and network node 102 is balanced across all available links in transmission trunk 107.

Typically, network communication between a port pair has an associated cost that is based on a plurality of factors, which includes maximum data rate supported by the ports, configured/negotiated maximum data rate, actual data rate and Latency. These costs are used to evaluate and choose links as paths for transmitting data across transmission trunk 107.

Individual link usage within a trunk varies based on the plurality of factors and whether the network is busy or idle. In some instances, a network may need all the active links and in other instances fewer links may be sufficient. Power consumption in the network system is high if all the links are kept active all the time, regardless of whether the links are being used or not. The adaptive embodiments described herein provide an efficient way to activate and de-activate links within a trunk so that trunk utilitization and power consumption are optimal.

Figure 2:
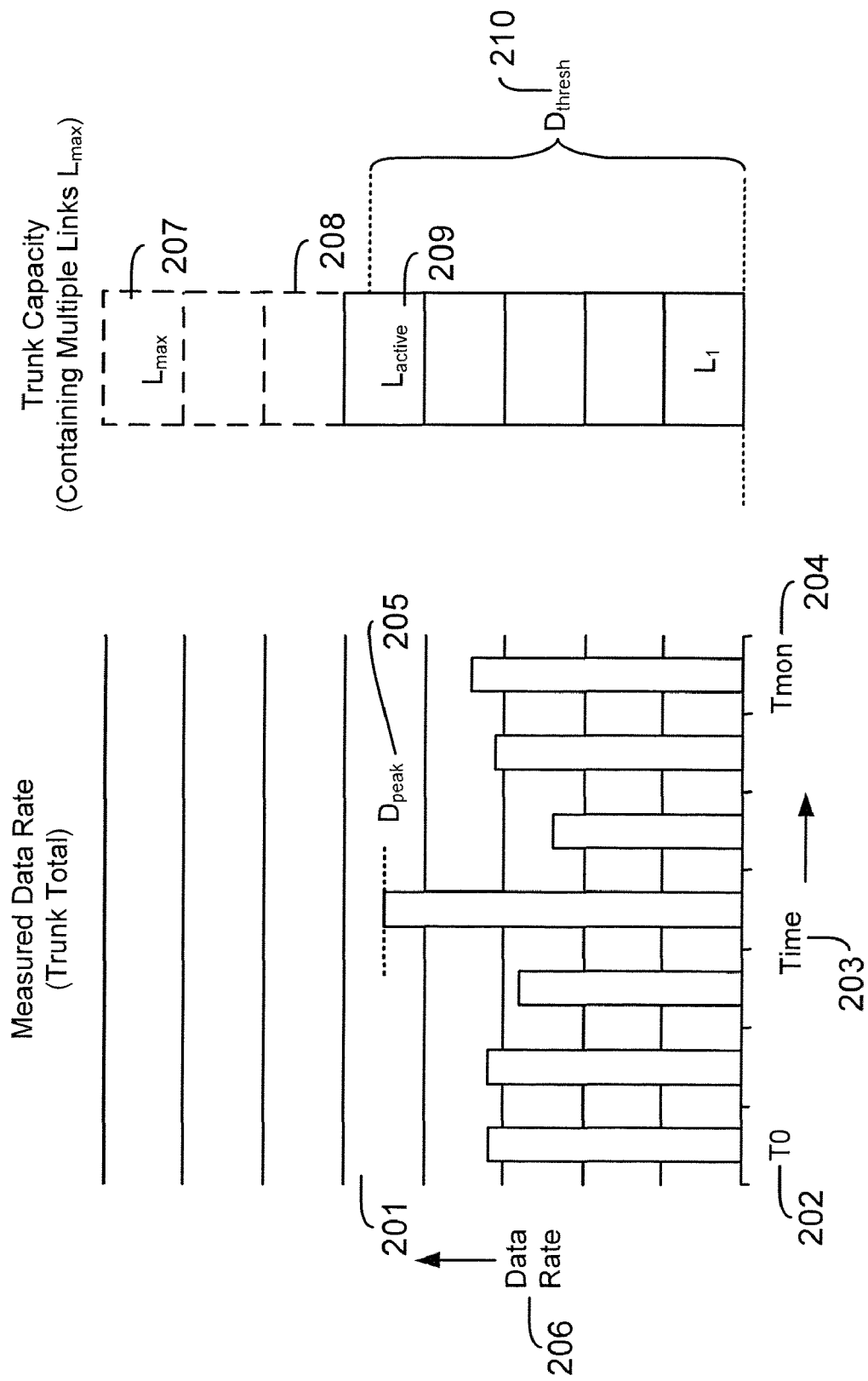
FIG. 2 graphically illustrates measuring data rates and trunk capacity in networks, according to one embodiment of the present disclosure.

Before describing the various processes of the present disclosure, the following describes certain factors/parameters that are used to power up or power down links in trunk 107. FIG. 2 shows a graph 201 with data rate 206 on the Y-axis as a function of time 203 on the X-axis. Data rate 206 is the amount of data transmitted and received per second and may be measured in Gigabits per second (G). Graph 201 also shows a peak data rate 205, which is the maximum data rate during a monitoring period, Tmon.

The monitoring period Tmon is the duration between a start time T0 202 and a monitoring time 204. During the monitoring period, data rate 206 is measured across all links in a transmission trunk. Tmon 204 may be specified by a user in accordance with the requirement of the network system.

Graph 208 illustrates trunk capacity for multiple links. Graph 208 shows Lmax 207, i.e. the maximum number of physical links capable of transmitting and receiving data in a transmission trunk. Lactive 209 is the number of physical links that are active at a given time. The Dthresh 210 is based on a maximum data rate capacity of the trunk operating with Lactive 209 number of physical links.

As described below with respect to the process flow diagrams, in one embodiment, the peak data rate 205 and Dthresh 210 are compared to determine if additional links should activated to accommodate network traffic or active links should be deactivated from a transmission trunk because they are being underutilized.

Figure 3:
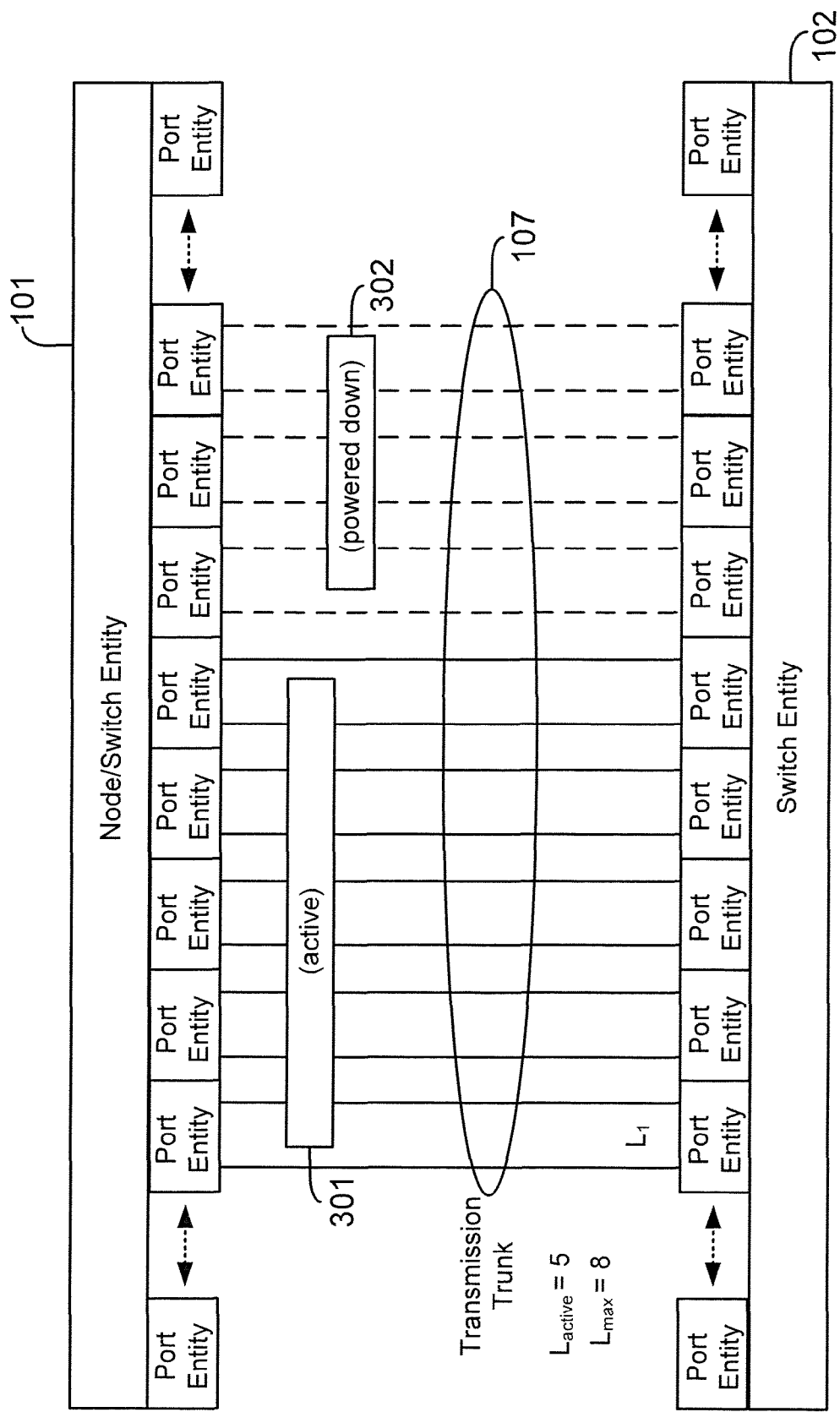
FIG. 3 shows an example of active links and inactive links between two network nodes in a network system, according to one embodiment of the present disclosure.

FIG. 3 shows an example of active links and inactive (powered down) links between two network nodes in network system 100, according to one embodiment of the present disclosure. In this example, transmission trunk 107 has 5 active links (shown as 301) and powered down links (shown as 302). The total number of links in transmission trunk 107 is 8, i.e., Lmax is 8.

In the FIG. 3 example, at any given time, only 3 additional links may be activated in trunk 107 since there are a total of 8 links available. Likewise, only 4 links may be deactivated at any given time, since a minimum of one link is need for enabling communication between network node 101 and 102.

Figure 4:
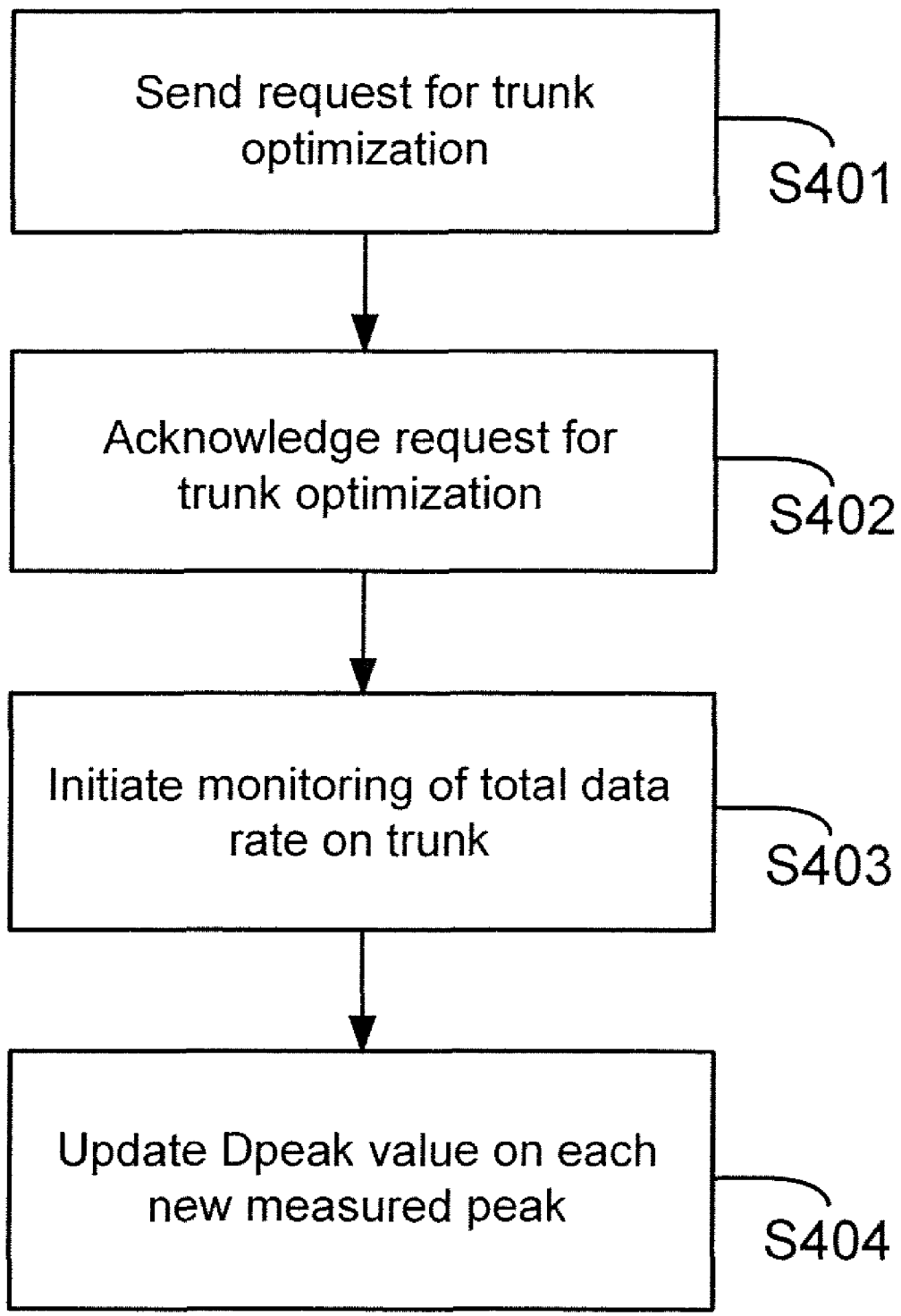
FIGS. 4-5 show process flow diagrams according to one embodiment of the present disclosure.

Process Flow:

FIG. 4 shows a flow chart for initialization in a self optimizing transmission trunk ("SOTT"), according to one embodiment of the present disclosure. A SOTT is a trunk that optimizes itself automatically by activating and deactivating links.

The process begins in block S401, when network node 101 sends a request to network 102 to initiate optimization of transmission trunk 107. Optimization may be enabled or disabled by a user by programming a register 104.

In block S402, network node 102 acknowledges the optimization request made by network node 101. The format and nature of the acknowledgement depends on the type of protocol that is used for network communication, for example, Ethernet, Fibre Channel, FCoE and others.

In block S403, network node 101 initiates data rate monitoring on the transmission trunk 107.

In block S404, the peak data rate Dpeak 205 is measured and updated. Processor 105 may be used to update Dpeak 205 at a specified time interval. The time interval may be fixed for example, 1 second or configured by a user interface (not shown) provided by management application 117A. At each time interval, the current data rate of the trunk is measured (e.g. Gbits per second) and compared to a current stored Dpeak value. If the current measurement is greater than the stored value then the Dpeak value is updated to the measured value.

Figure 5:
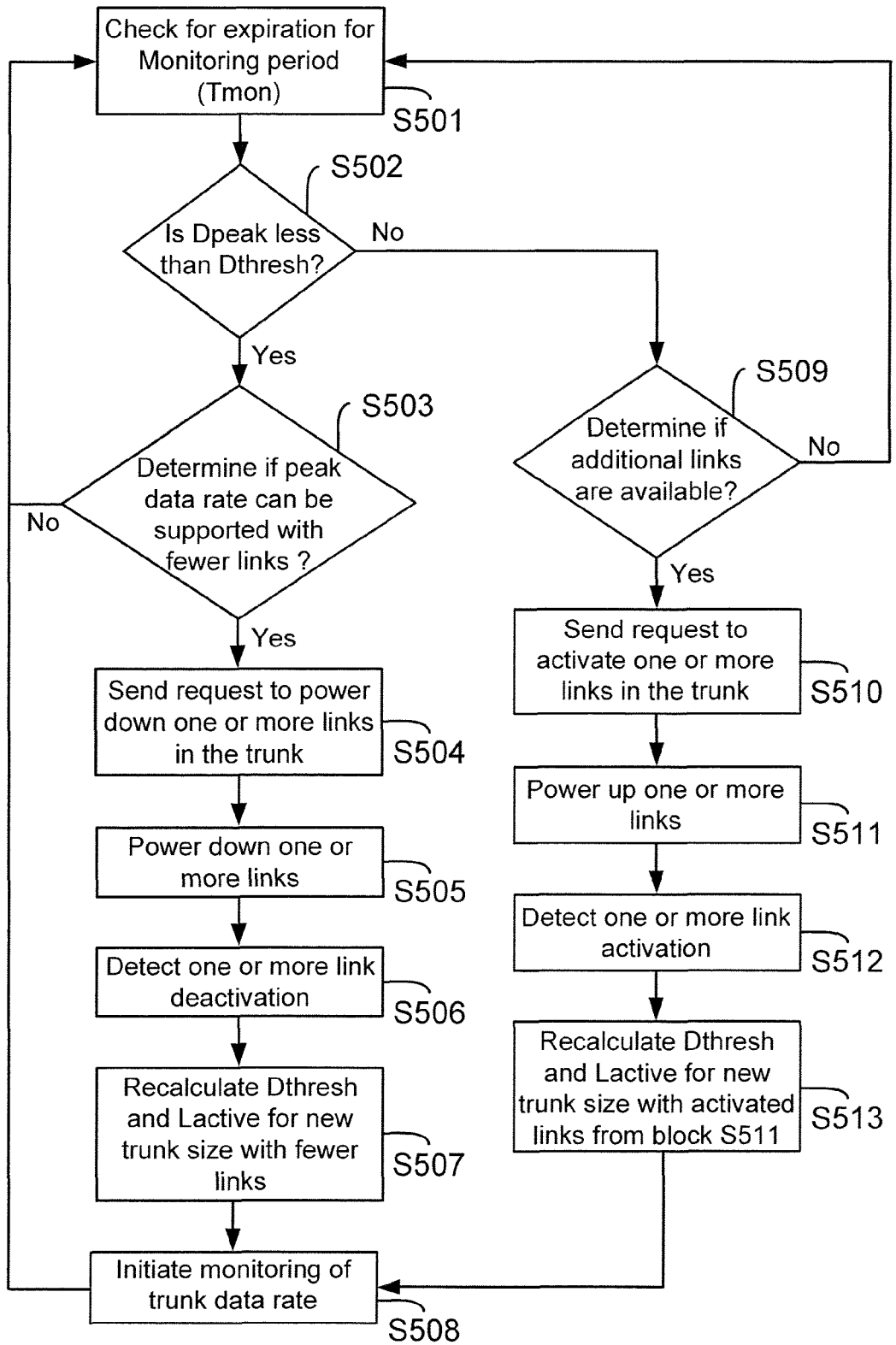

FIG. 5 shows a process flow chart for optimizing link usage and reducing power consumption in a network system, according to one embodiment of the present disclosure.

The process starts in block S501 where network node 101, checks for expiration of monitoring time (Tmon 204, FIG. 2). In one embodiment, processor 105 checks for expiration of the monitoring time.

In block S502, the process determines if Dpeak 205 is less than Dthresh 210. The process moves to block S503, if Dpeak 205 is less than Dthresh 210. The process moves to block S509, if Dpeak 205 is greater than or equal to Dthresh 210.

In block S503, network node 101 determines if peak data rate can be sustained and supported with fewer links. In one embodiment this determination is made by a network node processor (for example, 105) that calculates a new threshold value with a hypothetical reduced number of links. The processor compares the Dpeak value with a calculated new threshold value to determine if fewer links can be supported. For example, as shown in FIG. 3, network node 101 determines if it can support Dpeak 205 with fewer than 5 links. If the peak data rate can be sustained with fewer links, then, the process moves to block S504. If peak data rate cannot be supported with fewer links, then the process reverts back to step S501.

In block S504, network node 101 sends a request may also be referred to as a "sleep request") network node 102 to power down one or more links.

In block S505, network node 102 powers down one or more links on receipt of the sleep request from network node 101.

According to one embodiment of the present disclosure, undersubscribed or unused links are powered down. This results in reducing overall power usage and cooling requirements for network infrastructure components, for example server nodes and data switches. This is of particular benefit in environments that experience a wide range of capacity usage over time due to working hours, peak use for data backups etc.

In another embodiment of the present disclosure, by monitoring trunk usage over a longer duration of Tmon 204, the performance and capacity of a switched network can be optimized by re-deploying undersubscribed or unused links. For example, inter-switch or node-switch trunk ports may be re-tasked for use in other parts of the network or to support additional nodes such as servers or storage.

In block S506, network node 101 detects deactivation of one or more links. The deactivation operation is carried out in manner that does not cause network disruption, frame loss, transmission errors or reporting of any fault conditions.

In block S507, network node 101, updates the current number of active links Lactive 209 and the threshold data rate Dthresh 210 based on the new trunk size due to the deactivation in block S506.

In block S508, data rate monitoring is initiated and the process moves to step S501.

Now referring to block S509, network node 101 determines if additional links are available in the trunk, if Dpeak is less than Dthresh. If yes, the process moves on to step S510. If additional links are not available then the process reverts back to step S501. For example, in FIG. 3, additional links are only available up to a maximum of 8.

In block S510, network node 101 sends a request (may also be referred to as "wake request") to network node 102 to power up or activate one or more links in trunk 107.

In block S511, network node 102 powers up one or more links in the trunk 107.

In block S512, network node 101 detects activation of one or more links. The activation operation is carried out in a manner that does not cause network disruption, frame loss, transmission errors or reporting of any fault conditions.

In block S513, network node 101, updates the current number of active links Lactive 209 and threshold data rate Dthresh 210 based on the new trunk size after the activation in block S512. Thereafter, the process moves on to step S508 for monitoring data.

As described above, link optimization resulting in power reduction within a trunk is a function of Dpeak, Dthresh, Lactive and Lmax. The foregoing process uses these factors to support network traffic while reducing power consumption.

In another embodiment, instead of deactivating the links in block S504 or activating links in block S510, the network node 101 via management port 108 sends a notification to a user after the possibility of deactivating or activating links has been made in blocks S503 and S509, respectively. The notification may be sent to management application 117A (FIG. 1A) that is used by the user to accept or reject the option of deactivating or activating one or more links. If the user selects either option, then depending on the selected option (i.e. to deactivate and/or activate links), the process steps S504-S508 and S509-S513 are executed, as described above with respect to FIG. 5.

Although the present disclosure has been described with reference to specific embodiments, these embodiments are illustrative only and not limiting. Many other applications and embodiments of the present disclosure will be apparent in light of this disclosure and the following claims.

What is claimed is:

1. A machine implemented method for a network system having at least a first network node communicating with a second network node using a plurality of network links, the plurality of network links being grouped as a trunk, the method comprising:

(a) initiating monitoring of a usage of the trunk during a monitoring duration;

(b) monitoring a data transfer rate for the trunk for transferring information between the first network node and the second network node;

(c) determining a peak data transfer rate for the trunk during the monitoring duration;

(d) comparing the peak data transfer rate to a threshold data transfer rate for the trunk; wherein the threshold data transfer rate establishes a minimum number of links needed for communication between the first network node and the second network node;

(e) based on the comparison in step (d) determining if one or more of the plurality of network links can be deactivated by calculating a first hypothetical threshold value based on a reduced number of links compared to a number of links used in step (d); and then comparing the first hypothetical threshold value to the peak data transfer rate of step (d);

(f) based on the determination in step (e), if one or more of the plurality of network links can be de-activated, then de-activating one or more of the plurality of network links;

(g) establishing a first new threshold data transfer rate based on the deactivated network links in step (f);

(h) based on the comparison in step (d) and if the peak data transfer rate is equal to or greater than the threshold data transfer rate, determining if one or more of the plurality of network links can be activated by calculating a second hypothetical threshold value based on a greater number of links compared to the number of links used in step (d) and then comparing the second hypothetical threshold value to the peak data transfer rate of step (d);

(i) based on the determination in step (h), if the one or more of the plurality of network links can be activated, then activating one or more of the plurality of network links; and (j) establishing a second new threshold data transfer rate based on an increased number of network links from step (i).

2. The method of claim 1, wherein instead of deactivating the network links, sending a message to a user notifying a user that one or more networks links can be deactivated.

3. The method of claim 1, wherein instead of activating the network links, sending a message to a user notifying a user that one or more networks links can be activated.

4. The method of claim 1, wherein the monitoring duration is set by a user by programming a value in a register.

5. The method of claim 1, wherein a user using a management application can enable and disable automatic activation and deactivation of the network links.

6. A network system, comprising:
a first network node operationally coupled to a second network node using a plurality of links, the plurality of links being grouped into a trunk; and
a computing system having a processor for setting a monitoring duration for monitoring a data transfer rate for the trunk and a peak data transfer rate for the trunk;
wherein the first network node (i) monitors the data transfer rate and determines the peak data transfer rate for the trunk during the monitoring duration; (ii) compares the peak data transfer rate to a threshold data transfer rate for the trunk; wherein the threshold data transfer rate establishes a minimum number of links needed for communication between the first network node and the second network node; and (iii) determines if one or more of the plurality of links can be deactivated and deactivates one or more of the plurality of links; wherein one or more of the plurality of network links are de-activated if the peak data transfer rate is less than a first hypothetical threshold data transfer rate based on a fewer number of network links than a number of links used when the peak data transfer rate is determined;
wherein one or more of the plurality of network links are activated, if the peak data transfer rate is greater than or equal to the threshold data transfer rate and after the peak data transfer rate is compared to a second hypothetical data transfer rate that is based on a higher number of network links than the number of network links used for determining the peak data transfer rate.

7. The system of claim 6, wherein instead of deactivating the network links, a message is sent to a user notifying the user that one or more networks links can be deactivated.

8. The system of claim 6, wherein instead of activating the network links, a message is sent to a user notifying the user that one or more networks links can be activated.

9. A machine implemented method for a network system having at least a first network node communicating with a second network node using a plurality of network links, the plurality of network links being grouped as a trunk, the method comprising:
(a) for a monitoring duration, monitoring a data transfer rate for the trunk for transferring information between the first network node and the second network node;
(b) determining a peak data transfer rate for the trunk during the monitoring duration;
(c) comparing the peak data transfer rate to a threshold data transfer rate for the trunk; wherein the threshold data transfer rate establishes a minimum number of network links needed for communication between the first network node and the second network node;
(d) based on the comparison in step (c) deter-mining if one or more of the plurality of network links can be deactivated;
(e) based on the determination in step (d), if the one or more of the plurality of network links can be de activated, then de-activating one or more of the plurality of network links; and
(f) establishing a first new threshold data transfer rate based on the deactivated network links in step (e);
wherein the step of determining if one or more of the plurality of network links can be activated includes calculating a hypothetical threshold value based on a greater number of links compared to a number of links used in step (b) and then comparing the hypothetical threshold value to the peak data transfer rate of step (b); and
wherein the step for determining if one or more of the plurality of network links can be deactivated includes calculating a hypothetical threshold value based on a reduced number of links compared to a number of links used in step (b); and then comparing the hypothetical threshold value to the peak data transfer rate of step (b).

10. The method of claim 9, further comprising:
if the peak data transfer rate is equal to or greater than the threshold data transfer rate, determining if one or more of the plurality of network links can be activated; and if the one or more of the plurality of network links can be activated, then activating one or more of the plurality of network links.

11. The method of claim 10, further comprising:
establishing a second new threshold data transfer rate based on an increased number of network links.

12. The method of claim 9, wherein instead of deactivating the links, sending a message to a user notifying the user that one or more networks links can be deactivated.

13. The method of claim 10, wherein instead of activating the links, sending a message to a user notifying the user that one or more networks links can be activated.

14. The method of claim 9, wherein the monitoring duration is set by a user by programming a value in a register.

15. The method of claim 9, wherein a user using a management application can enable and disable automatic deactivation of the network links.

16. The method of claim 10, wherein a user using a management application can enable and disable automatic activation of the network links.

* * * * *

UNITED STATES PATENT AND TRADEMARK OFFICE
CERTIFICATE OF CORRECTION

PATENT NO. : 8,155,022 B1  
APPLICATION NO. : 12/552222  
DATED : April 10, 2012  
INVENTOR(S) : Stephen Ainsworth It is certified that error appears in the above-identified patent and that said Letters Patent is hereby corrected as shown below:

In column 1, line 63, delete "(e)" and insert -- (e) if --, therefor.

In column 3, line 21, delete "n" and insert -- n in --, therefor.

In column 3, line 35, delete "(FCo)," and insert -- (FCoE), --, therefor.

In column 6, line 43, delete "and" and insert -- and 3 --, therefor.

In column 7, line 35, delete "may" and insert -- (may --, therefor.

In column 10, line 16, in Claim 9, delete "deter-mining" and insert -- determining --, therefor.

In column 10, line 20, in Claim 9, delete "de activated," and insert -- de-activated, --, therefor.

Signed and Sealed this
Twenty-sixth Day of June, 2012

David J. Kappos
*Director of the United States Patent and Trademark Office*